Jan. 28, 1936.　　　　M. BURGER　　　2,028,752
PHOTOGRAPHIC CAMERA
Filed Sept. 6, 1934　　　2 Sheets-Sheet 1

Michael Burger
*INVENTOR*

BY Edward H Cumpston

ATTORNEY

Jan. 28, 1936.  M. BURGER  2,028,752
PHOTOGRAPHIC CAMERA
Filed Sept. 6, 1934  2 Sheets-Sheet 2

Michael Burger
INVENTOR
BY Edward H Cumpston
ATTORNEY

Patented Jan. 28, 1936

2,028,752

UNITED STATES PATENT OFFICE 2,028,752

PHOTOGRAPHIC CAMERA

Michael Burger, Munich, Germany, assignor to Friedrich Deckel, Munich-Prinz Ludwigshohe, Germany Application September 6, 1934, Serial No. 742,954
In Germany September 11, 1933

14 Claims. (Cl. 95—31)

This invention relates to photographic cameras and particularly to cameras of the type in which there is mechanism interconnecting the camera shutter with the means for feeding the film or other sensitized material.

An object of the invention is the provision of a generally improved and more satisfactory camera of the type above indicated.

Another object is the provision of a camera of this type so designed and constructed that "bulb" and "time" exposures can be made, as well as the usual "instantaneous" exposures.

A further object of the invention is the provision of a camera including a shutter of the "set" type and mechanism for setting or tensioning the shutter by the feeding of the sensitized material when ordinary "instantaneous" exposures are to be made, in combination with means for rendering this setting mechanism inoperative so that "bulb" and "time" exposures can be made when desired.

To these and other ends the invention resides in certain improvements and combinations of parts, all as will be hereinafter more fully described, the novel features being pointed out in the claims at the end of the specification.

In the drawings.

The same reference numerals throughout the several views indicate the same parts.

Figure 1:
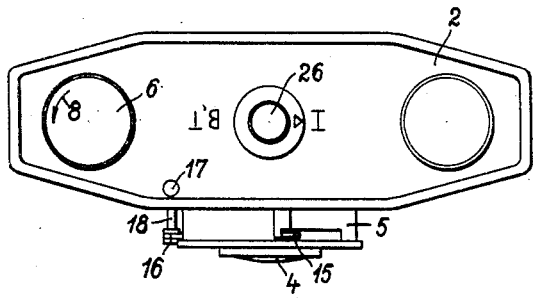
Fig. 1 is a plan of a camera constructed in accordance with one embodiment of the invention.

Referring now to the embodiment shown in Figs. 1 to 7, inclusive, there is indicated a camera having a main body or housing 1, the top of which is closed by a top cover 2, and the bottom of which is provided with a bottom cover 3. At the front of the main housing 1 there is a lens 4 and a shutter indicated in general by the numeral 5. Focusing may be accomplished in any known manner, either by moving the lens 4 alone, or by moving both the lens and the shutter.

This shutter is of the so-called "set" type as distinguished from the "automatic" type. That is, the shutter is one in which the spring or other motor element of the shutter is to be set or tensioned previous to the making of an exposure, the motor element being later released as a separate act, when the exposure is to be made. Shutters of this general type are well known, and one suitable for the purpose of the present invention is disclosed, for example, in Deckel Patent 1,687,123, granted October 9, 1928.

In the shutter shown in the Deckel patent, as well as in most other shutters of the "set" type, the setting or tensioning of the shutter is necessary when a so-called "instantaneous" exposure is to be made, but is neither necessary nor desirable when so-called "bulb" and "time" exposures are to be made. Consequently, if some provision is made for setting or tensioning the shutter through the movement of the means for feeding the film or other sensitized material, it follows that the camera can be used only for "instantaneous" exposures unless there is provided some way in which the automatic setting mechanism can be disconnected or made ineffective when it is desired to make "bulb" or "time" exposures. The camera of the present invention provides automatically operating setting or tensioning mechanism and also means for disconnecting this mechanism or rendering it ineffective, so that the improved camera herein disclosed can be used readily either for exposures of the instantaneous kind or for exposures of the bulb or time kind in which no previous setting or tensioning of the shutter takes place.

The means for feeding the film or other sensitized material may be of any known kind, including, for example, a knob 6 mounted on the top cover 2 and secured to a shaft 7 extending downwardly through the cover, the knob 6 when turned in the direction of the arrow 8, being effective in known manner to feed a fresh supply of sensitized material into the focal plane of the camera.

According to the present invention, the shaft 7 is provided, just beneath the cover 2, with a pinion 9 (Fig. 3) which meshes with a rack bar 10 provided at one end with a downturned ear 11. A spring 12 normally tends to keep the rack bar 10 at one end of its path of travel, but permits it to be moved rightwardly from the position shown in Fig. 3, when the shaft 7 is rotated by the knob 6.

The shutter 5 is provided with a setting or tensioning lever 15 (corresponding, for example, to the setting lever 6 of the Deckel patent above mentioned) and an actuating or release lever 16 (corresponding, for example, to the release lever 101 of said Deckel patent). For convenience of operation, the camera is provided with a plunger 17 extending upwardly through the top cover 2, which is operatively connected to a lateral pin 18 which, in turn, is connected to the release lever 16. Thus, instead of reaching around to the front of the camera to operate the release lever directly, the person using the camera may simply depress the plunger 17, readily accessible at the top of the camera, and this, through pin 18, will operate the lever 16 and make the exposure.

Figure 4:
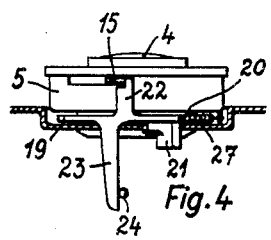
Fig. 4 is a view partly in plan and partly in horizontal section of part of the camera shown in Figs. 1 and 2, with the parts set for making an "instantaneous" exposure.
Figure 2:
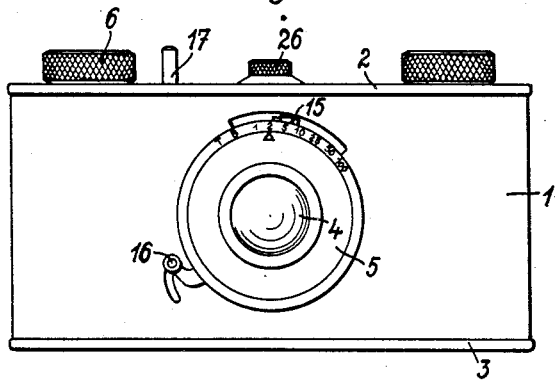
Fig. 2 is a front elevation thereof.
Figure 5:
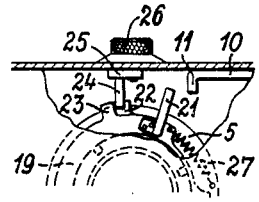
Fig. 5 is a view partly in elevation and partly in vertical section of the parts shown in Fig. 4, similarly set for an "instantaneous" exposure.
Figure 6:
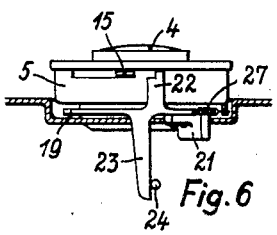
Fig. 6 is a view similar to Fig. 4 showing the parts set for a bulb or time exposure.
Figure 3:
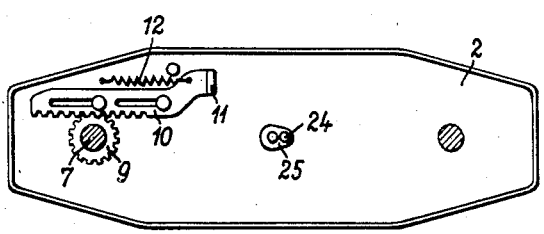
Fig. 3 is a view of the top cover of the camera shown in Figs. 1 and 2, viewed from below.
Figure 7:
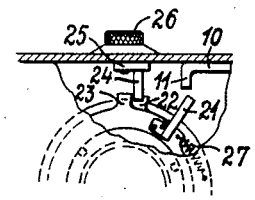
Fig. 7 is a view similar to Fig. 5 with the parts likewise in the bulb or time position.
Figure 8:
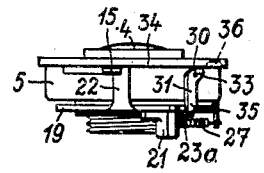
Fig. 8 is a view similar to Fig. 4 showing a slightly different embodiment of the invention, with the parts set for an instantaneous exposure.
Figure 9:
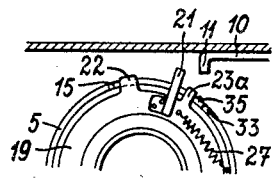
Fig. 9 is a view partly in elevation and partly in vertical section of the mechanism shown in Fig. 8.
Figure 10:
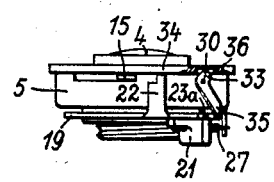
Fig. 10 is a view similar to Fig. 8 with the parts in position for a bulb or time exposure.
Figure 11:
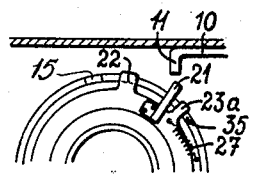
Fig. 11 is a view similar to Fig. 9 with the parts set for a bulb or time exposure.

The setting or tensioning lever 15 is operated, according to the present invention, by a ring 19 which is rotatable on a cylindrical part 20 of the shutter casing, so that the ring 19 in effect can be oscillated about the optical axis of the shutter as a center. This ring 19 is provided with three arms, denoted respectively by the numerals 21, 22, and 23. Of these, the arm 21 extends obliquely upwardly as shown in Fig. 5 to a position lying, under certain conditions, in the path of travel of the ear 11 on the rack bar 10. The arm 22 projects forwardly to a position in alinement with the setting or tensioning lever 15 of the shutter, while the third arm 23 extends rearwardly, as shown in Fig. 4, to a position to cooperate with a crank pin 24 mounted eccentrically on a crank plate 25 which may be turned by a knob 26 at the top of the camera. A spring 27, secured at one end to the ring 19 and at the other end to any suitable fixed point, constantly tends to turn the ring in a clockwise direction when viewed from the rear as in Fig. 5, so that the arm 23 on the ring 19 is constantly held against the pin 24.

When taking the usual instantaneous exposures, the crank pin 24 is in the position shown in Fig. 4 and an index mark on the knob 26 is opposite the notation "I" on the cover, as shown in Fig. 1. The parts are then in the position shown in Figs. 4 and 5, with the arm 21 on the ring 19 lying in the path of travel of the ear 11 on the rack bar 10. Consequently, each time that the feeding means 6 is operated to feed a fresh supply of sensitized material into proper position, the rack bar 10 moves rightwardly when viewed as in Fig. 3 or leftwardly when viewed as in Fig. 5, and this moves the arm 21 leftwardly, swinging the ring 19 in a counterclockwise direction and thereby moving the arm 22 to press the setting lever 15 leftwardly (when viewed as in Fig. 4) to set or tension the shutter. The feeding of the sensitized material thus sets the shutter ready for the next exposure, and an instantaneous exposure may thereafter be made merely by depressing the plunger 17, without having to go through the extra operation of setting the shutter. When the winding knob 6 is released, the springs 12 and 27 return the parts to their initial positions, but the setting lever 15 stays in its set or tensioned position until the exposure is made.

When it is desired, on the other hand, to make a "bulb" or "time" exposure, then the knob 26 is turned 180° from the position shown in Fig. 1, so that the index thereon is opposite the notation "B, T" on the cover. This moves the crank pin 24 to the position shown in Fig. 6, in which it lies rightwardly of the position shown in Fig. 4. The spring 27 is thus permitted to pull the ring 19 further around in a clockwise direction, to the position shown in Fig. 7, in which the arm 21 has been moved so far that it no longer lies in the path of travel of the end 11 of the rack bar 10. Consequently, when the film feeding means 6 is operated, the rack bar 10 will be moved, but this will have no effect on the shutter setting mechanism because the end 11 will move idly past the end of arm 21 without contacting therewith. Thus the setting arm 15 of the shutter will not be operated and the shutter will be in condition for a bulb or time exposure in the usual known manner.

Turning now to the alternative embodiment illustrated in Figs. 8 to 11, inclusive, there is shown the same shutter 5, and the parts 15, 19, 21, 22, and 27, in this form of the invention, may be identical with the parts bearing the same numbers in the previously described embodiment, and may operate in the same way. The arm 23, and its associated parts 24, 25, and 26, are omitted, however, in this embodiment. Instead, there is provided a short arm 23a on the ring 19, which cooperates with one end 35 of a bell crank lever 31 pivoted at 30 to the shutter casing.

The shutter is provided with an adjusting disk 34 (corresponding, for example, to the adjusting disk 63 of said Deckel patent) which can be turned to different positions to adjust the shutter for making different kinds of exposures (for example, instantaneous exposures and time exposures and bulb exposures). The rear face of this adjustable disk 34 is provided with a recess 36 in position to be opposite the other end 33 of the bell crank lever 31 when the disk 34 is set for time or for bulb exposure. When set for instantaneous exposures, however, the recess 36 is no longer opposite the end 33 of the lever 31, and the lever is forced out of the recess to the position shown in Fig. 8.

In this form of the invention, when the shutter is set for instantaneous exposures the end 33 of the lever 31 rides on the normal rear surface of the adjusting disk 34, thus holding the other end 35 of the lever against the arm 23a of the disk 19, to act as a stop for limiting movement of the disk in a clockwise direction. The disk 19 is thus held in the position shown in Figs. 8 and 9, with the arm 21 lying in the path of travel of the ear 11 on the rack bar 10, so that the shutter will be set in the manner previously described, every time that the sensitized material is fed by operation of the feeding knob 6. If the shutter adjusting disk 34 be shifted, however, to a position for taking time or bulb exposures, then the recess 36 is brought opposite the end 33 of the bell crank lever, allowing this end to enter the recess and thus permitting the other end 35 of the bell crank lever to move rightwardly to the position shown in Fig. 10. The spring 27 is then permitted to move the ring 19 further in a clockwise direction, to the position shown in Figs. 10 and 11, in which the end of the ring 21 is out of the path of travel of the ear 11 on the rack bar 10 and is not moved thereby, so that the shutter is not tensioned when the film feeding means 6 is operated. If the disk 34 be moved to adjust the shutter again for an instantaneous exposure, the end 33 of the bell crank lever will be cammed out of the recess 36 and the arm 19 will be shifted back from the position shown in Fig. 11 to the position shown in Fig. 9.

It will now be seen that in both embodiments of the invention, disconnectable mechanism is provided for setting the shutter by the act of feeding the sensitized material. This mechanism, in both cases, includes an operating member 10, 11 moved by movement of the feeding means 6, and a second member 19, 21, 22 which is moved by the operating member 10, 11 and which, in turn, sets the setting member 15 of the shutter. Furthermore, in both forms of the invention, the second member 19, 21, 22 can be moved to such a position that the arm 21 thereof is out of the path of travel of the operating member 10, 11, so that no setting of the shutter takes place.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A photographic camera comprising a shutter of the "set" type, means for feeding sensitized material, mechanism for automatically setting said shutter by operation of said feeding means, and means for rendering said mechanism inoperative.

2. A photographic camera comprising a shutter of the "set" type, means for feeding sensitized material, mechanism interconnecting said shutter and said feeding means to set said shutter by operation of said feeding means, and means for disconnecting said interconnecting mechanism so that said feeding means may be operated without setting said shutter.

3. A photographic camera comprising a shutter of the "set" type, means for feeding sensitized material, disengageable mechanism interconnecting said shutter and said feeding means and effective, when engaged, to set said shutter by operation of said feeding means, and means for engaging and disengaging said mechanism.

4. A photographic camera comprising a shutter of the "set" type, means for feeding sensitized material, disengageable mechanism interconnecting said shutter and said feeding means and effective, when engaged, to set said shutter by operation of said feeding means, and manual means for engaging and disengaging said mechanism at will.

5. A photographic camera comprising a shutter of the "set" type adjustable to make exposures of a plurality of different kinds, means for feeding sensitized material, mechanism operated by movement of said feeding means for setting said shutter to condition it for making an exposure, and means operable upon adjustment of said shutter for making one kind of exposure to render said mechanism inoperative to set said shutter and operable upon adjustment of said shutter for making another kind of exposure to render said mechanism operative to set said shutter.

6. A photographic camera comprising a shutter of the "set" type adjustable to make exposures of a plurality of different kinds, means for feeding sensitized material, and mechanism controlled by adjustment of said shutter for different kinds of exposures, for setting said shutter by movement of said feeding means.

7. A photographic camera comprising a shutter of the "set" type adjustable to make "instantaneous" exposures and other exposures, means for feeding sensitized material, mechanism operated by movement of said feeding means, when said shutter is adjusted for making "instantaneous" exposures, for setting said shutter to condition it for making an exposure, and means operable upon adjustment of said shutter for an exposure other than "instantaneous", for rendering said mechanism inoperative.

8. A photographic camera comprising a shutter of the "set" type adjustable to make "instantaneous" exposures and other exposures, means for feeding sensitized material, mechanism operated by movement of said feeding means, when said shutter is adjusted for making "instantaneous" exposures, for setting said shutter to condition it for making an exposure, and means operable automatically by adjustment of said shutter for a non-instantaneous exposure, for rendering said mechanism inoperative so that said shutter will not be set by movement of said feeding means.

9. A photographic camera comprising a shutter of the "set" type, means for feeding sensitized material, an operating member driven by movement of said feeding means, a second member effective, when moved by said operating member, to set said shutter to condition it for making an exposure, and means for moving said second member from an operative position in which it will be moved by movement of said operating member, to an inoperative position in which it will not be moved by movement of said operating member.

10. A photographic camera comprising a shutter of the "set" type, means for feeding sensitized material, an operating member driven by movement of said feeding means, a second member effective, when moved by said operating member, to set said shutter to condition it for making an exposure, and means operable manually at will for moving said second member to and from an operative position with respect to said operating member.

11. A photographic camera comprising a shutter of the "set" type, means for feeding sensitized material, an operating member driven by movement of said feeding means, a second member effective, when moved by said operating member, to set said shutter to condition it for making an exposure, and means operable automatically by adjustment of said shutter to take different kinds of exposures, for moving said second member to and from an operative position with respect to said operating member.

12. A photographic camera comprising a shutter of the "set" type, means for feeding sensitized material, an operating member driven by movement of said feeding means, a second member effective, when moved by said operating member, to set said shutter to condition it for making an exposure, and lever means movable by adjustment of said shutter to take different kinds of exposures, for cooperating with said second member to place said second member in operative or inoperative position with respect to said operating member.

13. A photographic camera comprising a shutter including an arm settable to tension the shutter for making an exposure, means for feeding sensitized material, an operating member moved by movement of said feeding means, a second member having one portion for cooperation with said settable arm and another portion for cooperation with said operating member, and means for shifting said second member from a position in which said other portion thereof is out of the path of travel of said operating member, to another position in which said other portion is in the path of travel of said operating member so that movement of said feeding means will move said operating member and through it move said second member to shift said settable arm to tension the shutter.

14. A photographic camera comprising a shutter including an arm settable to tension the shutter for making an exposure and a disk adjustable to different positions for making different kinds of exposures, said disk having a recess therein, means for feeding sensitized material, mechanism operated by movement of said feeding means for shifting said settable arm to tension the shutter, and a member having a portion engageable in said recess when said disk is in one position and movable out of said recess when said disk is moved to another position, for controlling said mechanism to render it operative and inoperative.

MICHAEL BURGER.